Dec. 31, 1935.  C. C. ABBOTT  2,026,412
ELECTRIC HEATER
Filed June 12, 1934

Inventor:
Charles C. Abbott,
by Harry E. Dunham
His Attorney.

Patented Dec. 31, 1935

2,026,412

UNITED STATES PATENT OFFICE 2,026,412

ELECTRIC HEATER

Charles C. Abbott, Pittsfield, Mass., assignor to General Electric Company, a corporation of New York Application June 12, 1934, Serial No. 730,221

3 Claims. (Cl. 219—19)

My invention relates to electric heaters and has for its object the provision of a simple and compact heater especially adapted for use as a low temperature air heater.

In carrying out my invention in one form, I provide an outer metallic casing having the size and shape of the desired heater together with a looped or U-shaped insulated resistance conductor, preferably of the sheathed type, which is inserted in the outer casing and has its lengths secured against the outer casing by means of wedge members placed between these lengths. Preferably a plurality of wedge members are used, one for each length of the resistance conductor, and these wedge members are secured in place by indentations between them struck in the outer sheath.

Figure 1:
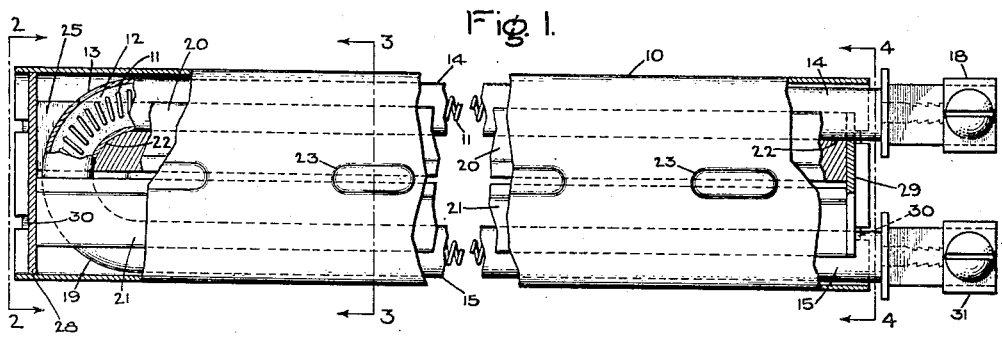
Figure 2:
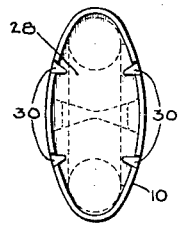
Figure 3:
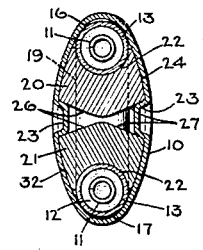
Figure 4:
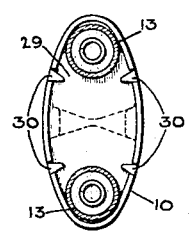

For a more complete understanding of my invention reference should be had to the accompanying drawing in which Fig. 1 is a fragmentary elevation view partially in section of an electric heating unit embodying my invention; Figs. 2 and 4 are end views of the units shown in Fig. 1; while Fig. 3 is a sectional view along the line 3—3 of Fig. 1 looking in the direction of the arrows.

In carrying out my invention in form I provide an outer metallic sheath or casing 10 having the desired shape and size of the completed heating unit and preferably made of a material having good heating conductivity such as copper or brass. As shown, this outer sheath 10 is tubular in form and has an oval or elliptical cross section.

Mounted within the outer sheath 10 is the electric heating means, shown as a sheathed electric heating unit of the type described and claimed in my Patent 1,494,938, dated May 20, 1924. Briefly stated, this heating unit comprises a helical resistance heating conductor 11 embedded in compacted powdered electrically insulating material 12 in a tubular metallic sheath 13 which in the present instance may be made of brass or copper. This sheathed heating unit is bendable, and as shown is bent in the form of a loop or hairpin, there being parallel lengths 14 and 15 which fit in the substantially semicircular opposite edges 16 and 17 of the outer sheath 10, as shown in Fig. 3. As shown, the hairpin-shaped resistance heating unit extends substantially the full length of the outer casing 10 with its terminals 18 and 31 projecting from one end of the casing while the bend 19 of the hairpin is adjacent the other end of the casing.

The parallel lengths 14 and 15 of the sheathed heating unit are forced outward against the inner walls of the casing 10 and wedged in the narrow bends 16 and 17 of the casing by means of a plurality of wedging members placed between them. As shown, the curvature of the bends 16 and 17 is greater than the curvature of the sheath 13 whereby this wedging action is provided for. These wedging members 20 and 21 are identical in construction with each other, each being provided with a groove 22 in which lies the adjacent parallel length of the heating unit. The members furthermore, as indicated in Figs. 2, 3 and 4, have their side walls 24 and 32 shaped to conform with the oval shape of the outer casing 10. Furthermore each wedging member is provided at one end with a slot 25 through which passes the bend 19 of the heating unit.

These wedging members are forced apart so as to secure the lengths 14 and 15 of the heating unit tightly against the inner wall of the outer casing in any suitable manner, as shown by striking a plurality of indentations 23 in the outer case spaced at intervals along its length on each side. It will be observed that the two wedging members have their adjacent sides or faces each beveled from its center outward so as to provide two opposite sides 26 and 27 at each side of the casing, as seen in Fig. 3, these sides gradually diverging apart from the center outward. Consequently the forcing of the indentations between these adjacent or opposite sides of the wedging members constitutes an effective means for forcing the members apart. In this manner the casing, heating unit and wedging members are rigidly and tightly clamped together in good thermal relation with each other.

Preferably the heater is assembled by first assembling the sheathed heating unit and wedging members and then inserting these parts in the outer casing, after which the indentations are formed to secure them together. The ends of the casing are closed by plates 28 and 29 which are secured in place by punching inward a plurality of tabs 30 in each end of the casing.

The wedging members 20 and 21 are preferably made of a material having good heat conductivity, such as brass. In addition to their function of securing the heating unit, the wedging members serve to conduct heat freely from the heating unit to the intermediate regions of the casing 10, i. e., the regions between and most remote from the lengths 14 and 15 of the heating unit. It will further be observed that the wedging members, together with the heating unit, almost completely fill the casing, and consequently heat is conducted to practically all parts of the casing. In fact the only portions of the casing not having heat conducted directly to them are the narrow strips, one on each side, along the lines of the indentations. Therefore, substantially the entire outer surface of the casing is an effective radiator of heat.

What I claim as new and desire to secure by Letters Patent of the United States is:

1. An electric heater comprising an outer metallic casing having a cross sectional shape providing oppositely disposed relatively narrow curved portions, a sheathed resistance heating unit shaped in the form of a hairpin and inserted in said casing, said heating unit having a cross sectional curvature less than the curvature of said portions, a pair of wedging members in said casing between the lengths of said heating unit and indentations in said casing between said wedging members forcing said wedging members apart against the lengths of said heating unit to thereby force said heating unit into said curved portions of said casing.

2. An electric heater comprising an outer metallic casing having a cross sectional shape providing oppositely disposed narrow curved portions, a metal sheathed resistance heating unit in said casing, said heating unit being shaped in the form of a hairpin, and having a cross sectional curvature less than the curvature of said portions, a pair of heat conducting wedging members in said casing between the lengths of said heating unit, said wedging members substantially filling said casing so as to thereby conduct heat to substantially all portions of said casing not in engagement with said heating unit, and said wedging members having their adjacent faces each beveled from the center outward, and indentations in said casing between said wedging members forcing said wedging members apart against the lengths of said heating unit to thereby force said heating unit tightly against said casing.

3. An electric heater comprising an elongated outer metallic casing having a cross sectional shape providing oppositely disposed relatively narrow bent portions, a resistance heating unit extending in a plurality of lengths in said casing, said unit being provided with a tubular outer metallic sheath having a cross sectional curvature less than the curvature of said bent portions, a pair of wedging members made of heat conducting material between the lengths of said heating unit, said wedging members substantially filling said casing so as to thereby conduct heat to substantially all portions of said casing not in engagement with said heating unit, and indentations in said casing between said wedging members forcing said wedging members apart against the lengths of said heating unit to thereby force said heating unit into said bent portions.

CHARLES C. ABBOTT.